RALPH B. PRESSLER
VICTOR O. WALKER
INVENTOR.

BY Edmund W. E. Kamm
ATTORNEY

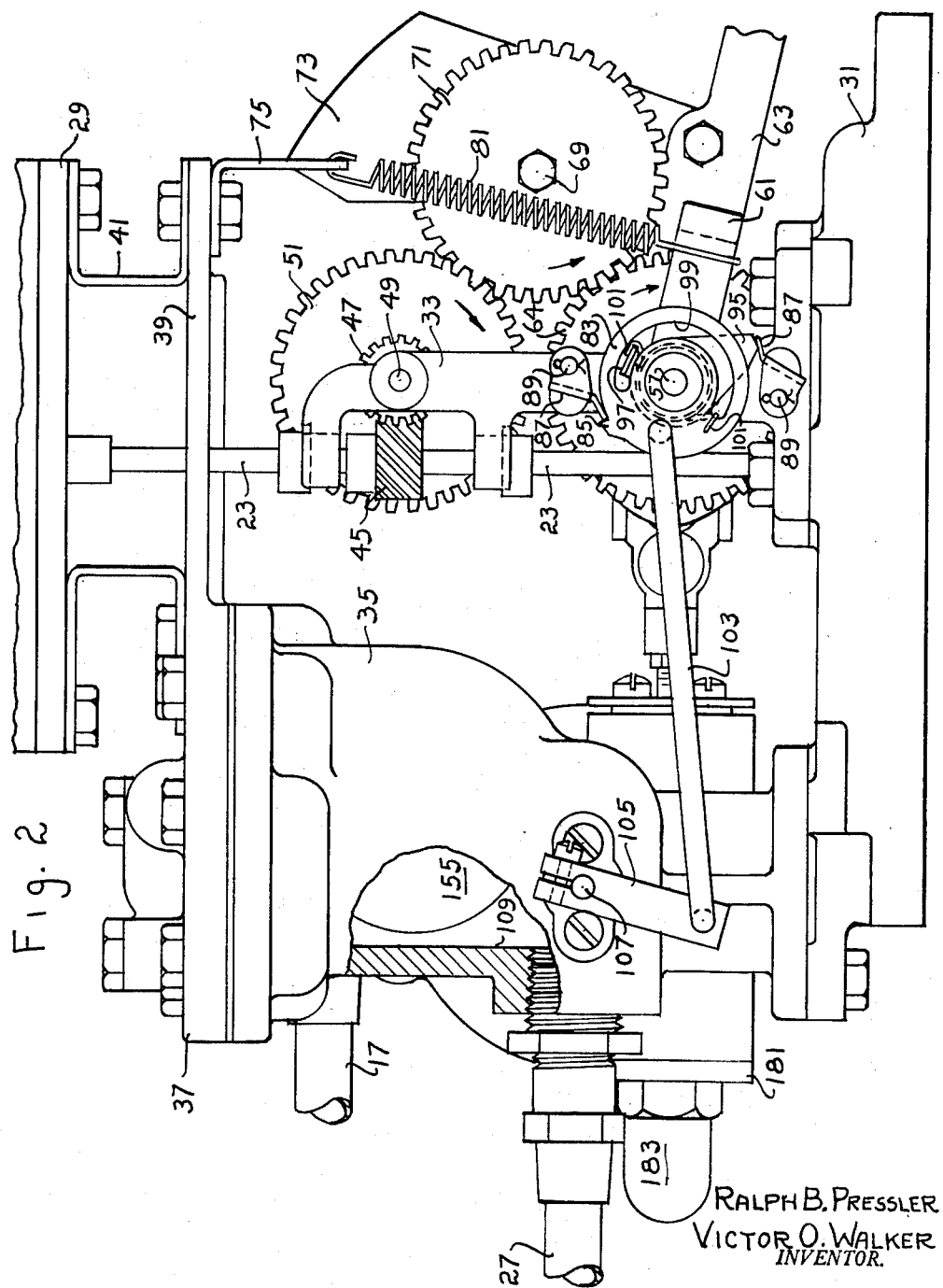

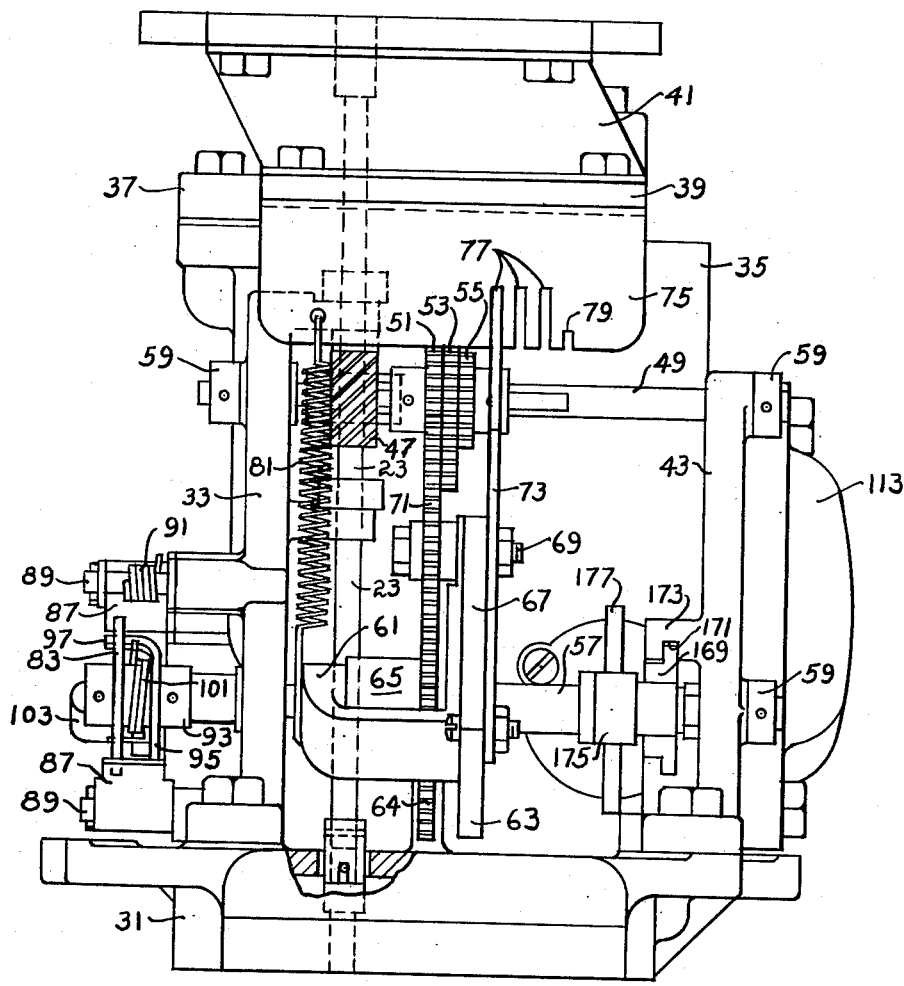

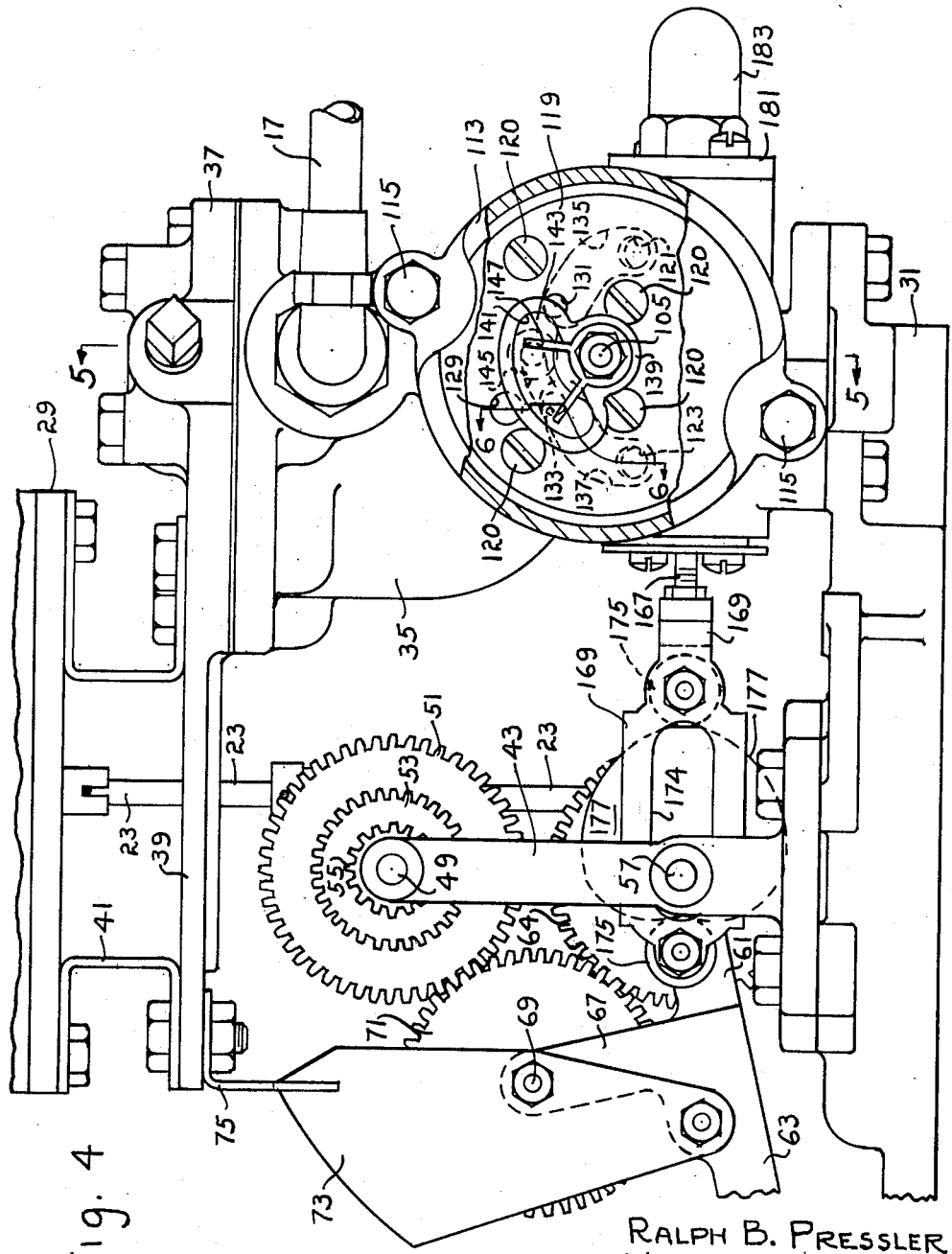

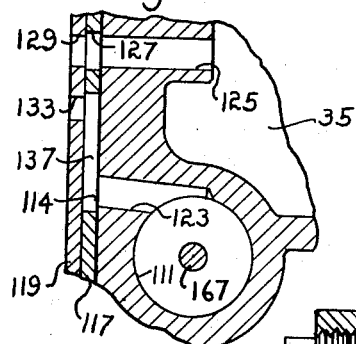
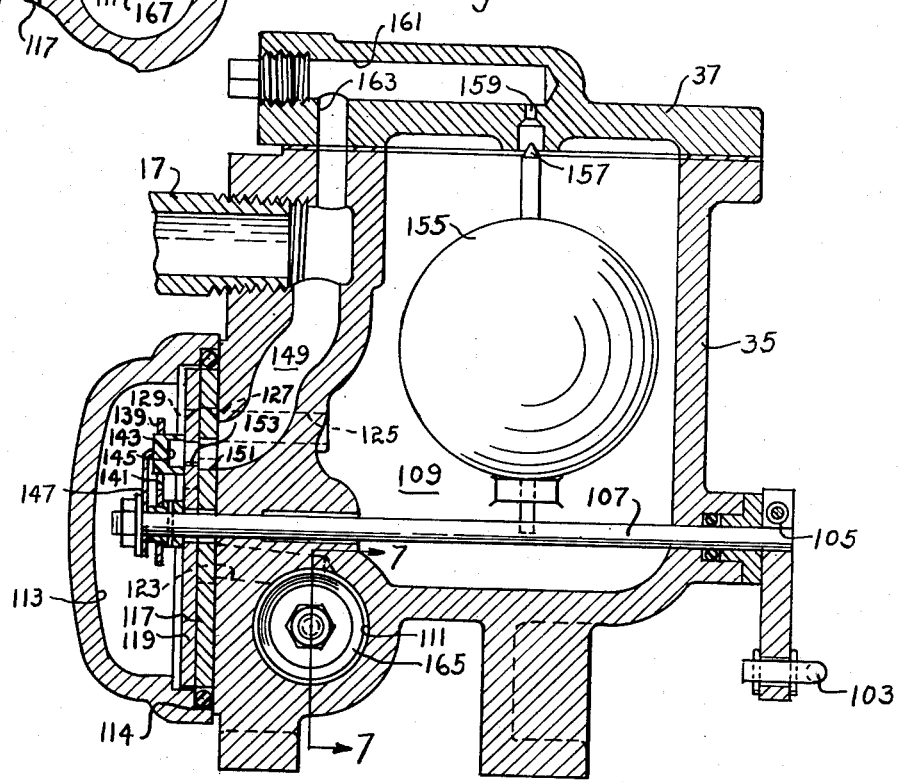
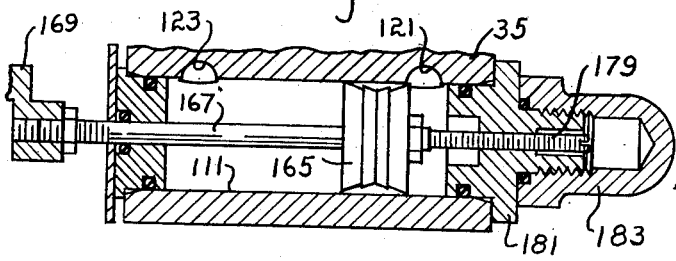

United States Patent Office 2,849,014
Patented Aug. 26, 1958

2,849,014

LIQUID PROPORTIONER

Ralph B. Pressler and Victor O. Walker, Fort Wayne, Ind., assignors to Bowser, Inc., Fort Wayne, Ind., a corporation of Indiana Application May 28, 1952, Serial No. 290,392

6 Claims. (Cl. 137—98)

This invention relates to a liquid proportioner. More specifically it relates to an apparatus which will regularly discharge a small flow of liquid into a pipe or other channel in which there is a relatively large flow of liquid of a different kind and which will maintain the percentage or ratio of the two liquids substantially constant.

It is an object of the invention to provide an apparatus for injecting anti-knock material, such as tetra-ethyl lead into a motor fuel such as gasoline in predetermined proportion.

Another object is to provide means for varying the percentage of the material added.

A further object of the invention is to provide a construction which will effectively handle a highly dangerous fluid without leakage.

Yet another object of the invention is to provide means for controlling the apparatus for adding the liquid from a point remote therefrom.

Still another object is to provide an apparatus which will accurately measure a dangerous liquid.

It is a further object of the invention to provide means for metering the secondary liquid under suction head so that leakage will be minimized.

These and other objects will become apparent from a study of the specification and the drawings which are attached hereto, form a part hereof and in which:

Figure 2 is a side elevation with parts in section showing especially the speed change and valve operating mechanisms.

Figure 3 is an end elevation viewed from the right of Figure 2 showing the same mechanisms.

Figure 4 is an elevation of the side opposite the side shown in Figure 2, partly in section, showing the valve and piston operating mechanisms.

Figure 5 is a sectional view taken substantially on the line 5—5 of Figure 4 showing the gas separator, valve, piston and porting.

Figure 6 is a sectional view taken substantially on the line 6—6 of Figure 4 showing one of the ports leading to the cylinder.

Figure 7 is a sectional view taken substantially on the line 7—7 of Figure 5 showing the cylinder, piston and the stroke regulating stop.

Figures 1, 8:
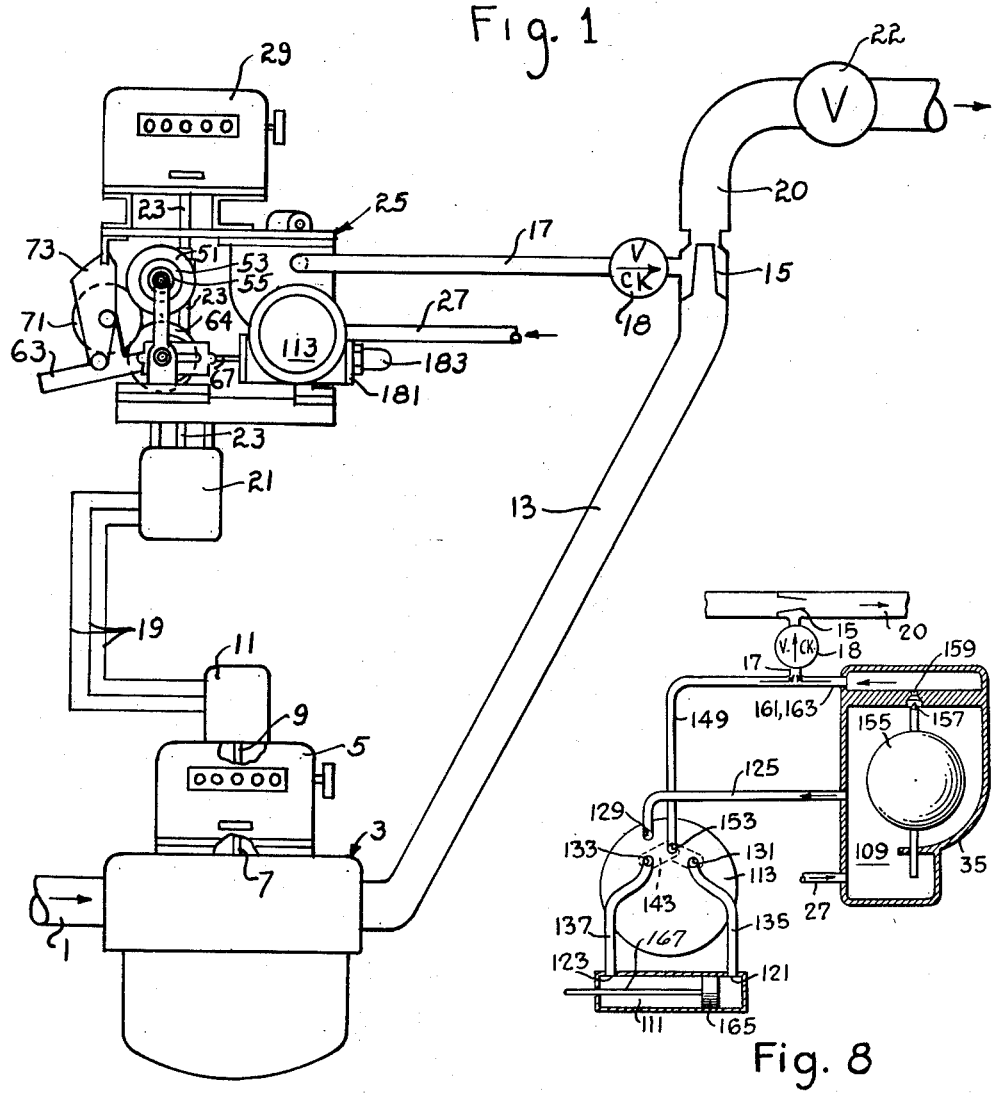
Figure 1 is a general view of the proportioning system.
Figure 8 is a schematic view illustrating the flow through the system.

Referring first to Figure 1, the numeral 1 represents the pipe through which the primary liquid, such as gasoline, is flowing under pressure created as by means of a pump, static head pressure, etc. A meter 3 of any suitable type is mounted in the line and is provided with a suitable register 5 for indicating the total gallonage passed through the line. The meter may be of the type disclosed in the patent to Blum, No. 1,977,424, issued October 16, 1934, for Fluid Meter.

The output shaft 7 of the meter drives the register in a known manner and may be extended as at 9 to drive a generator 11 of a remote transmission mechanism such as a "Selsyn" drive.

The discharge pipe 13 from the meter preferably includes an eductor or aspirator 15 which creates a partial vacuum in the secondary liquid discharge line 17. Line 17 has an outflow check valve 18 adjacent the eductor to prevent backflow from line 20 into line 17. Both fluids are discharged into line 20 which may have a valve 22 therein.

Running from the generator 11 are a number of wires 19 which connect it with the motor 21 which in turn drives the input shaft 23 of the meter 25 for the secondary liquid. The supply line 27 to this meter is connected to a suitable source of liquid not under pressure such as a tank (not shown) which is disposed slightly below the level of the meter 25.

The secondary liquid meter may have its input shaft connected to drive a suitable register 29, if desired.

For a description of the secondary liquid meter, reference is had to Figures 2 to 7. The numeral 31 represents a base for the meter in which the shaft 23 is suitably journalled.

Mounted on the base is a bracket 33 and a meter and vapor separator body 35. A suitable cap 37 is provided for this body and the cap includes an extension 39 which serves as the support for the adapter 41 on which the register 29 is mounted.

As shown in Figure 4, a second bracket 43 is also mounted on the base for supporting the change speed and piston drive mechanisms.

Mounted on the shaft 23 is a helical gear 45 which drives a mating gear 47 which is fixed to shaft 49. Also fixed on the shaft 49 is the three step cone gear 51, 53, 55 of 48, 32 and 16 teeth respectively. The shaft 49 and a countershaft 57 are supported in the brackets 33—43 and are held against endwise motion by suitable collars 59.

Slidably and rotatably mounted on the shaft 57 is a yoke 61 having a handle 63. A 48 tooth gear 64 having a hub 65 is slidably mounted on shaft 57 but is keyed to the shaft to transmit rotation thereto. The ends of the hub 65 bear on the arms of the yoke so that the hub and gear will be shifted endwise by the yoke.

As shown, particularly in Figure 4, an arm 67 projects upwardly from the yoke and carries on a shouldered bolt 69 on which is rotatably mounted a 48 tooth idler gear 71 which is in mesh with gear 64. Also mounted on the yoke is a gear aligning plate 73.

An indexing plate 75 is mounted to and depends from the extension 39. The plate is provided with three full notches 77 and a small slot 79 for the reception of the aligning plate 73. The plate enters the notches 77 to align the gear 64 with any of the steps of the cone gear and enters the small slot to hold the gear out of meshing position with the cone gear.

A spring 81 is supported by the indexing plate and the yoke to hold the gear 71 in mesh with the selected cone gear and the aligning plate in the notch.

This, it will be seen that the cone gear 51, 53, 55 being driven in time with the input shaft 23, will drive the counter shaft 57 in the ratio of 1::1, 3::2 and 2::1.

Rotatably mounted on the left end (Fig. 3) of shaft 57 is a latch plate 83 which has a single, peripheral lug 85 which is adapted to be stopped by either of the pawls 87 which are pivotally mounted on pins 89 which are spaced 180 degrees apart. The pawls are urged into contact with the periphery of the disc by springs 91 and serve to engage the lug so as to prevent rotation of the disc in one direction.

Fixed to the shaft 57 is a hub 93 which carries a cam 95 and a bent lever 97 which projects substantially parallel to the shaft and through a slot 99 in the latch plate.

One end of a spring 101 is hooked to the latch plate and has its other end hooked to the lever 97 so that as the lever rotates the spring will be wound. The cam 95 extends outwardly beyond the peripheries of the plate and lugs so that at proper intervals it will cam the pawl which is holding the lug and free the plate 83 for rotation by the spring 101.

A link 103 having bent ends has one of such ends entered in a hole in the latch pate 83 and the other in a lever 105 which is fixed to a valve actuating shaft 107 in the body 35.

As shown, particularly in Figure 5, the body 35 is provided with a gas separating chamber 109 into which the inlet secondary liquid flows from pipe 27. A cylinder 111 is formed in the body and a valve chamber 113 is mounted on the face 114 of the body by suitable screws 115.

A channel plate 117 is fixed to the face 114 and a port plate 119 is fixed to the channel plate by means of screws 120, as shown in Figure 4.

Passages 121, 123 connect the opposite ends of the cylinder 111 with the face 114. A channel 125 similarly connects the chamber 109 with the face and aligned holes 127, 129 in the plates 117, 119 connect this channel with the valve chamber.

Ports 131 and 133 are formed in the port plate 119 and are connected in communication with the passages 121, 123 respectively by the channels 135, 137 formed in the channel plate 117.

A valve actuator 139 is mounted on the rod 107 in spaced relation with respect to plate 119 and is provided with an opening 141 which is adapted to receive a valve 143 which has an arcuate passageway 145 formed in the face which rests on the plate 119.

A spring plate having fingers 147 is also fixed on shaft 107 with the fingers in engagement with the valve so as to hold it on its seat.

The fluid outlet passageway 149 is cored in the body (Fig. 5) and communicates with the valve at all times by means of ports 151, 153 in the plates 117, 119.

As shown in Figure 5, a float 155 is mounted in the separation chamber 109 and serves to operate a needle valve 157 which opens and closes the port 159 at the top of the chamber and which communicates with the discharge line 17 by way of passages 161, 163.

Mounted in the cylinder 111 is a double acting piston 165. The piston rod 167 is carried by a cross-head 169 (Fig. 4) which is guided in grooves 171 formed in guides 173 formed on the bracket 43. The cross-head is slotted at 174 to clear the shaft 57.

The cross-head carries a pair of spaced rollers 175 which serve as followers for the heart-shaped cam 177 which is fixed to the end of the shaft 57. The distance across the cam at its highest and lowest points is slightly less than the distance between the followers so that there is some play in the piston at the ends of its strokes.

Referring again to Figure 7, the stop screw 179 is mounted in the cylinder head 181 and a cap 183 provided to cover it. This serves to accurately limit the stroke of the piston.

It will be seen that all head points and shafts are sealed by suitable toroid seals to insure against leakage of the liquid. Preferably the piston cups and all the seals are made of polytetrafluoroethylene commonly designated "Teflon."

While I have shown a remote drive, it is of course obvious that if conditions permit, the shaft 23 of the secondary meter may be directly connected to be driven by the shaft 9 of the primary meter.

Operation

Assuming that fluid under pressure is available in the line 1 and that the valve 22 is open, the meter 3 will operate and shaft 9 will rotate the register 5 and the generator 11.

The rotations of the generator are transmitted through the wires 19 to the motor 21 which rotates the shaft 23 in time with the shaft 9 and in turn drives the cone gear 51—53—55 in the same ratio.

The gear 71 is set in mesh with the particular gear required to get the proper proportion of secondary fluid and will accordingly, through gear 64 drive the shaft 57 at the required speed in a clockwise direction (Fig. 2).

The arm 97 will wind the spring 101 and force the lug 85 into engagement with one of the pawls 87 which holds it against further rotation until the cam 95 strikes and raises the pawl.

Latch plate 83 thereupon rotates 180 degrees very quickly, to the position in which lug 85 is caught by the other pawl 87. The link 103 is therefore moved very quickly from the position shown in Figure 2 to a position 180 degrees therefrom so that the lever 105 on the valve rod 107 and the valve actuator 139 will be shifted from the Figure 2 and 4 positions to positions which are substantially opposite with respect to the vertical line through the center of shaft 107.

Thus the valve 143 will be shifted from the position shown in Figure 4 in which it connects ports 153 and 133 in communication to one in which ports 153 and 131 are in communication.

As shown in Figure 4, liquid is passing into the float chamber under substantially atmospheric pressure because the pressure in line 17 is below atmospheric pressure due to the operation of the eductor 15. When gas is contained in the secondary fluid, it will separate and collect at the top of the chamber. Liquid will pass from the chamber through passage 125, 127, 129 into the valve chamber 113, through ports 131, 135 and 121 into cylinder 111 on one side of the piston 165. Liquid is being drawn out of the cylinder at the other side of the piston through 123, 137, 133, valve channel 145, ports 153, 151, channel 149 to pipe 17 by the eductor 15.

When the piston reaches the end of the stroke, the valve rod is flipped to its other position as described above and the flow to and from the cylinder is reversed due to reversal of the valve.

Since the liquid flowing to the cylinder is under sufficient pressure (substantially atmospheric pressure) to actuate the piston, the stroke of the piston is merely controlled by the cam 177 which acts on the cross-head rolls 175 so that the travel of the piston will be in direct proportion to the degree of rotation of the shaft 57. This is an imporant feature since it is desirable to maintain the feed of secondary fluid as nearly continuously proportional to the flow in the lines 1, 13.

On the reverse stroke, the stroke is finished by differential pressure acting on the piston 165 pressing it toward and in contact with the screw 179. Thus because of the fact that the cam rolls do not ride on the cam 177 at the end of the stroke, it is possible to make a relatively fine adjustment of the volumetric capacity of the cylinder 111. The adjustment cannot be any greater than the amount of clearance between the cam and the roller 175 which limits the stroke of the piston toward the stop. However, sufficient adjustment is provided to render the measurement accurate.

Should the meter 3 slow down or stop the mechanism 25 will slow or top in synchronism therewith.

The shaft drive of meter 3, piston stroke and cylinder diameters are so proportioned that the mechanism 25 will deliver 3 cubic centimeters of fluid per gallon of liquid passing through meter 3 when the gears 71, 51 are in mesh; will deliver 2 cubic centimeters per gallon when gears 71, 53 are engaged and 1 cubic centimeter per gallon when gears 71, 55 are engaged. Obviously, however, the ratio of the gears may be changed to alter the proportions.

Further, since the valve mechanism shifts the valve 143 very quickly, the interruption in flow of the secondary liquid is very small so that it is practically continuous.

Any gas separated from the secondary liquid will collect in chamber 109 and when the volume is sufficient to depress the liquid level to the point that float 155 opens valve 157, 159, the gas will escape into the discharge line 17 and be carried by this line through the aspirator into the primary fluid line. The aspirator assists in the mixing of the fluids and insures that if there is a leak in the discharge line 17, air will be drawn into the line rather than that liquid will leak from the line.

Of course, if the piston should stick at any portion of its cycle, or not move for any reason, it will be quickly picked up and assisted by the cam so that the proportional discharge of the secondary liquid will be maintained.

It is obvious that various changes may be made in the form, structure and arrangement of parts without departing from the spirit of the invention. Accordingly, applicants do not desire to be limited to the specific embodiment disclosed herein primarily for purposes of illustration; but instead they desire protection falling fairly within the scope of the appended claims.

What we claim to be new and desire to protect by Letters Patent of the United States is:

1. A proportioning meter comprising a double-acting displacement mechanism, means for supplying liquid thereto, a valve movable between two positions for controlling the flow of liquid to and from the displacement mechanism, a mechanism for moving said valve quickly from one position to the other and means connected to the displacement mechanism for controlling the rate of travel thereof.

2. A proportioning meter comprising a double-acting displacement mechanism, means for supplying liquid thereto, a valve movable between two positions for controlling the flow of liquid to and from the displacement mechanism, a mechanism for moving said valve quickly from one position to the other, means connected to the displacement mechanism for controlling the rate of travel thereof, and common means for actuating the valve and the rate of travel control means.

3. A proportioning meter comprising a double-acting displacement mechanism, means for supplying liquid thereto, a valve movable between two positions for controlling the flow of liquid to and from the displacement mechanism, a mechanism for moving said valve quickly from one position to the other, means connected to the displacement mechanism for controlling the rate of travel thereof, and common means for actuating the valve and the rate of travel control means, said common means including a driving means and a speed change mechanism connected to be driven thereby.

4. A proportioning meter comprising a double-acting displacement mechanism, means for supplying a first liquid thereto, a valve movable between two positions for controlling the flow of liquid to and from the displacement mechanism, a mechanism for moving said valve quickly from one position to the other, means connected to the displacement mechanism for controlling the rate of travel thereof, and a second fluid meter connected to drive said valve mechanism and said displacement controlling means.

5. A proportioning meter comprising a double-acting displacement mechanism, means for supplying a first liquid thereto, a valve movable between two positions for controlling the flow of liquid to and from the displacement mechanism, a mechanism for moving said valve quickly from one position to the other, means connected to the displacement mechanism for controlling the rate of travel thereof, common means for actuating the valve and the rate of travel control means, and a second fluid meter connected to drive said common means.

6. A proportioning meter comprising a double-acting displacement mechanism, means for supplying liquid thereto, a valve movable between two positions for controlling the flow of liquid to and from the displacement mechanism, a mechanism for moving said valve quickly from one position to the other, means connected to the displacement mechanism for controlling the rate of travel thereof, a latch plate having a lug, a spring for actuating the latch plate, a pair of pawls disposed in the path of the lug and spaced so as to alternately engage the lug, means for tensioning said spring and means for alternately disengaging said lug and the engaged pawl, and means connecting said latch plate to actuate said valve.

References Cited in the file of this patent

UNITED STATES PATENTS

| | | |
|---|---|---|
| 1,763,335 | Watts | June 10, 1930 |
| 1,999,881 | Lowe | Apr. 30, 1935 |
| 2,009,622 | Kennedy | July 30, 1935 |
| 2,024,115 | Schwartz | Dec. 10, 1935 |
| 2,090,069 | Richardson | Aug. 17, 1937 |
| 2,148,671 | Allen | Feb. 28, 1939 |
| 2,218,393 | Corydon | Oct. 15, 1940 |
| 2,262,031 | Meyer | Nov. 11, 1941 |
| 2,527,136 | Kagi et al. | Oct. 24, 1950 |
| 2,554,772 | Bereman | May 29, 1951 |

UNITED STATES PATENT OFFICE

CERTIFICATE OF CORRECTION

Patent No. 2,849,014                                                        August 26, 1958

Ralph B. Pressler et al.

It is hereby certified that error appears in the printed specification of the above numbered patent requiring correction and that the said Letters Patent should read as corrected below.

Column 4, line 66, for "slow or top" read -- slow or stop --.

Signed and sealed this 4th day of November 1958.

(SEAL)
Attest:

KARL H. AXLINE
Attesting Officer

ROBERT C. WATSON
Commissioner of Patents